Figure 1:
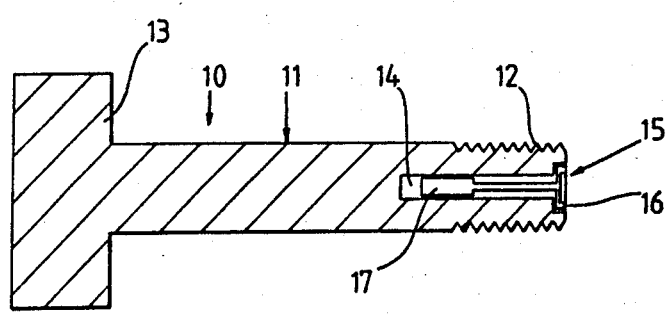

United States Patent [19]

Hirst

[11] Patent Number: 4,909,685

[45] Date of Patent: Mar. 20, 1990

[54] FASTENER, POWER TOOL FOR USE WITH SAME AND METHOD TIGHTENING THE FASTENER

[75] Inventor: John A. B. Hirst, Kenilworth, United Kingdom

[73] Assignee: Exotech Limited, West Midlands, United Kingdom

[21] Appl. No.: 275,055

[22] PCT Filed: Apr. 8, 1987

[86] PCT No.: PCT/GB87/00240

§ 371 Date: Nov. 15, 1988

§ 102(e) Date: Nov. 15, 1988

[87] PCT Pub. No.: WO88/08088

PCT Pub. Date: Oct. 20, 1988

[51] Int. Cl.⁴ .............................................. F16B 31/12
[52] U.S. Cl. ........................................ 411/9; 411/14; 73/761
[58] Field of Search ................. 411/8, 9, 13, 14, 916; 73/761

[56] References Cited

U.S. PATENT DOCUMENTS

| 2,316,720 | 4/1943 | Ramsey | 411/916 |
| 3,954,004 | 5/1976 | Orner | 73/761 |
| 3,969,960 | 7/1976 | Pagano | 73/761 |
| 4,294,122 | 10/1981 | Couchman | |
| 4,338,054 | 7/1982 | Dahl | 411/8 |
| 4,525,114 | 6/1985 | Hirst | 411/9 |

FOREIGN PATENT DOCUMENTS

| 1428643 | 12/1968 | Fed. Rep. of Germany | 411/8 |
| 2714334 | 10/1978 | Fed. Rep. of Germany | 411/9 |
| 2746689 | 2/1979 | Fed. Rep. of Germany | 411/8 |
| 152927 | 8/1985 | Japan | 73/761 |
| 882442 | 11/1961 | United Kingdom | |

Primary Examiner—Gary L. Smith
Assistant Examiner—Flemming Suether
Attorney, Agent, or Firm—Spensley Horn Jubas & Lubitz

[57] ABSTRACT

Attainment of a predetermined stress in a bolt (10) which is being tightened is indicated by interference with the freedom of a pin (15) to rotate relative to the bolt. The pin extends along a bore (14) from an end of the bolt and the bore lies in that part of the bolt which presents the minimum diameter of the bolt. The invention is especially useful for detecting when the stress to which the bolt is subjected exceeds the elastic limit of the bolt, because the radial contraction of the bore which then occurs is large, relative to the contraction which occurs during elastic deformation of the bolt.

6 Claims, 2 Drawing Sheets

4,909,685

FASTENER, POWER TOOL FOR USE WITH SAME AND METHOD TIGHTENING THE FASTENER

DESCRIPTION OF INVENTION

The present invention is concerned with screw-threaded fasteners, examples of which include bolts and studs. It is a common requirement for bolts and studs to be tightened to a predetermined load. Various proposals have been made to achieve this. These includes the use of torque wrenches for tightening and the provision, in a fastener, of means for indicating when a predetermined load has been achieved.

Known means provided in threaded fasteners for indicating when a predetermined load has been achieved are responsive to elongation of the fastener.

According to a first aspect of the present invention, there is provided a method of tightening a threaded fastener wherein a predetermined change in a diameter or other transverse dimension of the fastener is indicated or detected. Generally, threaded fasteners are elongated and have circular transverse cross sections. However, the unthreaded part of a bolt may have a transverse cross section other than circular.

The fastener preferably has indicating means so arranged as to be free to move relative to the fastener, when the fastener is subjected to stress of one value, and to be restrained against movement relative to the fastener when the fastener is subjected to a stress of a substantially different value. However, it is also within the scope of the invention for the predetermined change in a diameter of the fastener to affect the range of possible movement of the indicating means relative to the fastener.

The changes in diameter, in particular contraction, of a fastener which occur when the fastener is subjected to tension beyond its elastic limit are more pronounced than are the changes in diameter which occur when the fastener is stressed within its elastic limit. Accordingly, the invention is more readily applied to tightening of a fastener to a degree such that the elastic limit is exceeded.

According to a second aspect of the invention, there is provided a threaded fastener having indicating means responsive to a change in a diameter or other transverse dimension of the fastener for indicating when a selected value of stress has been attained in the fastener.

The preferred fastener is hollow, the indicating means lying at least partly inside the fastener. However, a fastener with indicating means which overlies a part of a circumferential surface of the fastener is also within the scope of the invention.

According to a third aspect of the invention, there is provided a power tool for tightening a screw-threaded fastener, the tool having control means for controlling operation of the tool and signalling means for co-operating with the indicating means of a fastener according to the second aspect of the invention and with the control means to transmit to the control means a signal indicating that said selected value of stress has been attained in the fastener.

Figure 2:
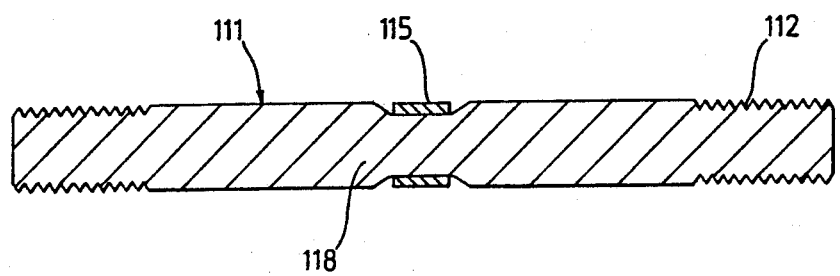
Figure 3:
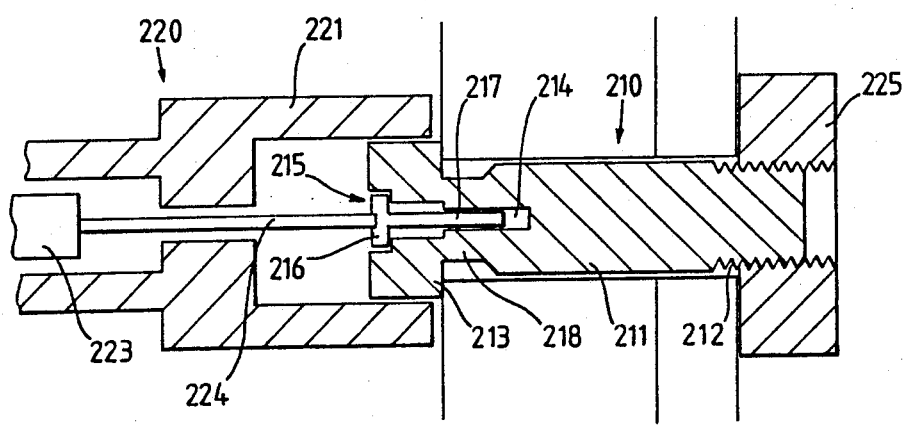
Figure 4:
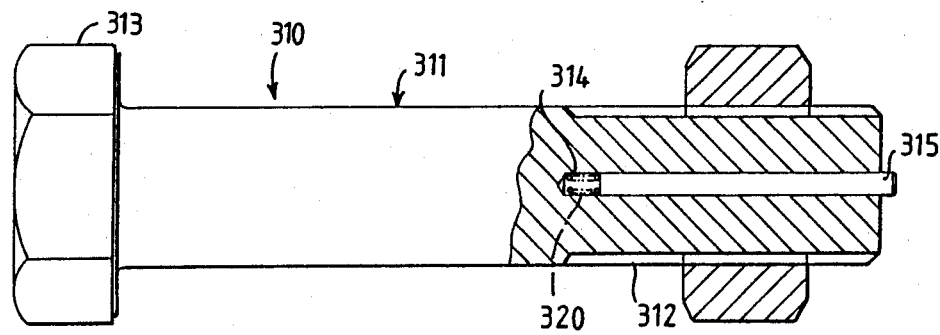

Examples of fasteners embodying the second aspect of the invention, which are used in a method according to the first aspect and an example of a power tool in accordance with the third aspect of the invention will now be described, with reference to the accompanying drawing, wherein:

FIG. 1 shows a cross-section of a bolt in a plane containing a longitudinal axis o the bolt, FIG. 2 shows a similar view of a stud, FIG. 3 shows a similar representation of the combination of a further bolt and a power tool for turning the bolt; and FIG. 4 shows a further bolt partly in diammetral cross-section.

The bolt 10 shown in FIG. 1 comprises a shank 11 having on one end portion thereof a screw-thread 12 and a head 13 at the opposite end of the shank. The threaded end portion of the shank is hollow and defines a cylindrical bore 14 which extends longitudinally of the bolt and, in the example illustrated, is co-axial with the thread 12.

Indicating means 15 is disposed in the bore 14. The indicating means is in the form of a pin having a head 16 which, as shown in FIG. 1, may be received in a recess in the end of the shank 11. The pin 15 includes a cylindrical shank portion 17 which lies radially inwardly of that part of the thread 12 which is near to the unthreaded part of the shank 11. An intermediate part of the pin which extends between the cylindrical portion 17 and the head 16 may have the same diameter as or a smaller diameter than that of the portion 17. It will be noted that there is a clearance space between the end of the pin and the blind end of the bore 14.

The diameter of the cylindrical portion 17 is such that, when the bolt 10 is unstressed, the portion 17 is a close fit in the bore 14 but the pin 15 is free to turn about the axis of the bore 14 relative to the bolt. Turning of the pin can be effected by means of a hand tool, for example an allen key introduced into an appropriate socket in the head 16 of the pin.

When the bolt 10 is tightened into a nut (not shown) on the thread 12, with an assembly (also not shown) which is to be held by the bolt being trapped between the head 13 of the bolt and the nut, the shank 11 of the bolt is subjected to tensile stress. This causes elongation of the bolt and consequent radial contraction of the shank and of the bore 14. Provided the stress is below the elastic limit of the bolt, the radial contraction is slight and occurs along at least the threaded part of the shank 11.

If the stress is increased, by tightening of the bolt, to the elastic limit of the bolt, further tightening causes more pronounced contraction of the shank 11 and of the bore 14 but this contraction occurs mianly in that part of the shank which is immediately adjacent to a face of the nut presented towards the head 13. This part of the shank contains the cylindrical portion 17 and significant contraction of the bore 14 results in the shank gripping the portion 17 firmly so that rotation of the pin 15 relative to the bolt 10 is restrained. There is thus provided an indication that the elastic limit of the bolt has been reached.

Alternatively, the respective diameters of the bore 14 and portion 17 may be such that the pin 15 is free to rotate relative to the bolt 10 when the latter is unstressed but is restrained against rotation, by gripping of the portion 17 within the bore 14, when a predetermined stress which is less than the elastic limit of the bolt is attained. It will be appreciated that, because the contraction which occurs when the bolt is stressed elastically is considerably less than the contraction which occurs when the bolt is stressed beyond its elastic limit, the respective diameters of the bore and cylindrical portion 17 must be controlled within smaller tolerances if the pin 15 is required to give an indication of the attainment of a stress which is less than the elastic limit. Furthermore, the attainment of the elastic limit can be indicated with somewhat greater accuracy than can the attainment of some lower, predetermined stress.

In FIG. 2, there is illustrated a stud which differs from the bolt of FIG. 1 in htat the stud of FIG. 2 is not hellow. In FIG. 2, parts corresponding to those hereinbefore described with reference to FIG. 1 are indicated by a like reference numeral with the prefix I and the preceding description is deemed to apply, except for the differences mentioned.

The indicating means of the stud shown in FIG. 2 is a ring 115 which overlies the peripheral surface of a part 118 of the shank 111 of the stud. The part 118 has the form of a neck, having a diameter which is not greater than, and is preferably somewhat less than the root diameter of the thread 112. Preferably, the shank 111 has the minimum diameter over a substantial part of its length, the neck presenting a cylindrical surface between shoulders at opposite ends of that surface. Alternatively, the diameter of the shank may have a minimum value over a relatively short part of the length of the shank, the shank defining a relatively narrow groove at the neck.

When the stud 110 is unstressed, the ring 115 is an interference fit on the neck 118 and is thus restrained against rotation relative to the stud. When the stud is tightened, it is subjected to tensile stress, the length of the shank 111 is increased somewhat and the diameter of the shank is decreased slightly. The ring 115 is, however, not subjected to any significant tensile stress and its diameter does not change. When the stress to which the stud 110 is subjected exceeds the elastic limit of the stud, the material yields in the neck 118 and there is a pronounced radial contraction of the neck relative to the other parts of the stud and relative to the ring 115. In consequence of this, the mutual gripping relation of the ring and the neck is terminated and the ring is free to turn on the neck. Provided the ring is accessible, the freedom of the ring to turn can be checked during tightening of the stud and an indication thereby obtained when the elastic limit of the stud has been attained.

It will be understood that the stud of FIG. 2 may be provided with indicating means in the form of a pin, rather than in the form of a ring. In this case, the pin would be placed in a bore extending along the axis of the stud from one end thereof past the neck 118 would conveniently be positioned somewhat nearer to one end of the stud than to the other end. Alternatively, the provision of a neck may be avoided, the pin indicating a change in the diameter of the bore at a position along the stud which corresponds to a part of one of the threads on the stud.

In FIG. 3, there is illustrated a bolt 210 and certain parts of a power tool 220 used for tightening the bolt. Parts of the bolt 210 which correspond to parts of the bolt 10 are indicated by like reference numerals with the prefix 2 and the preceding description is deemed to apply, except for the differences hereinafter mentioned.

The power tool 220 has driving means 221 which may be of known form and defines a polygonal recess for receiving the head 213 of the bolt. A motor, for example an air motor, (not shown) is provided for applying torque to the driving means 221. Control means 223 is provided for controlling operation of the motor. There is operatively associated with the control means signalling means 224 for transmitting to the control means a signal indicating that a predetermined change in a diameter of the bolt 210 has occurred. In the example illustrated in FIG. 3, the signalling means has the form of a rod which extends from the control means through the interior of the driving means 221 and which has a free-end portion with a shape and size complimentary to the shape and size of the recess in the head 216 of the pin 215. The control means 223 is arranged to apply torque to the rod 224 and to permit operation of the motor of the tool 220 whilst the rod rotates. The rod is free to rotate with the pin 215 when the bolt 210 is unstressed.

As the bolt 210 is tightened, the bore 214 contracts and a predetermined change in the diameter of the bore establishes a mutually gripping relation between the pin and the bolt, thus impeding rotation of the pin and of the signalling means 224. The control means 223 responds to this by terminating operation of the motor of the tool 220. The control means may comprise a known electric transducer which provides an electrical output signal indicating whether the signalling means 224 is turning or not. This output signal may be used to control operation of the motor.

The relative dimensions of the bore 214 and pin 215 may be selected to provide that tightening of the bolt will be terminated when the bolt has been subjected to a stress which is below the elastic limit of the bolt. Alternativeely, the pin 215 may be free to rotate until the elastic limit of the bolt is exceeded.

In FIG. 3, the tool 220 is illustrated with the driving means 221 engaged with the head 213 of the bolt for driving same. Accordingly, the bore 214 extends into the bolt from the head end thereof and the head 216 of the pin is accessible within a recess in the head 213 of the bolt. Alternatively, the tool may be engaged with a nut 225 on the threaded part of the bolt for driving the nut along the thread of the bolt. In this case, the bore 214 would extend into the bolt from the end thereof opposite to the head and the head 216 of the pin would be accessible in a recess provided in the shank 211 of the bolt. In a case where the bore 214 lies in a threaded part of the bolt, the minimum diameter of the bolt may be presented by that threaded part. In the case illustrated in FIG. 3, where the bore 214 lies in the head and an adjacent part of the bolt, the minimum diameter of the bolt is presented by a part of the shank which contains the bore 214 and the pin 215 and this part may constitute an unthreaded neck 218.

Whilst it is necessary for a mutually gripping relation to be established between the pin 215 and the bolt 210 in the neck 218, during tightening of the bolt, it is not necessary for such relation to be established at other positions along the length of the bolt. Thus, either the pin 215 or the bore 214 may be of stepped form, there being a substantial radial clearance between the pin and the surface of that part of the bore 214 which lies in the head 213.

In a further alternative arrangement, either the bore or the pin is of tapered form. This arrangement also provides substantial clearance between the pin and the surface of the bore in regions where radial contraction of the bore will be relatively small, but enables a mutually interfering relation to be established between the pin and the boundary surface of the bore in a region where radial contraction of the bolt is somewhat greater. Furthermore, this arrangement enables a predetermined contraction of the bore to be indicated either by restraint of rotation of the pin relative to the bolt or by limitation of the extent to which the pin can be introduced into the bore. Thus, the distance which the pin can travel along the bore may be checked intemittently, during tightening, until that travel is limited to a predetermined distance, corresponding to a predetermined radial contraction of the bore.

In FIG. 4, there is shown a bolt and nut. Parts of the bolt corresponding to parts of the bolt described with reference to FIG. 1 are identified by like reference numerals with the prefix 3 and the preceding description is deemed to apply, except for the differences hereinafter mentioned.

The pin 315 lies mainly in the bore 314 but includes amn end portion protruding from the bore. There is also disposed within the bore a coiled compression spring 320 which acts between the blind end of the bore and the pin 315 and opposes movement of the pin along the bore to a position in which the pin is contained entirely within the bore. The spring may be attached to the pin, so that the spring limits movement of the pin in a direction outwardly of the bore. At least one turn of the spring adjacent to the blind end of the bore may be an interference fit in the bore.

When the bolt of FIG. 4 is unstressed, the pin 315 is free to slide along the bore and can easily be depressed, by finger pressure, into the bore. When the bolt has been subjected to a predetermined tensile stress, the pin is gripped by the walls of the bore 314 so that sliding of the pin along the bore is restrained. The application of finger pressure to the end of the pin fails to move the pin along the bore and this indicates that a predetermined stress has been attained.

It will be noted that the pin 315 lies in the threaded part of the bolt. The example of pin illustrated in FIG. 4 is of uniform diameter along its entire length. Alternatively, the pin may be of stepped form, an end portion of the pin nearest to the blind end of the bore having a larger diameter so that this end portion of the pin can be gripped by the bolt, when subjected to the predetermined stress, whilst the remainder of the pin is of smaller diameter and is not gripped.

To avoid thermal expansion and contraction affecting the degree of accuracy with which the tension in a bolt can be indicated by the pin, the bolt and the pin are preferably formed of the same material or of materials which have the same co-efficient of thermal expansion. Generally, the bolt and pin will be formed of steel.

The diameter of the bore 14 is typically within the range one millimeter to six millimeter. Preferably, this diameter is within the range two millimeter to three millimeter. In a case where a part only of the shank of a bolt is threaded, the length of the bore preferably exceeds the length of the thread but does not exceed twice the length of the thread. Particularly in a case where the pin lies entirely inside the fastener, the length of the pin is somewhat less than that of the bore. Whilst we prefer the pin to lie entirely inside the fastener, in order that the fastener shall protect the pin against mechanical damage, the head or other end portion of the pin may lie outside the fastener. In this case, the provision of a recess in the end of the pin may be avoided. The pin may be gripped externally by the fingers of a user or by a tool, in order to apply torque to the pin.

The features disclosed in the foregoing description, or the accompanying drawings, expressed in their specific forms or in terms of a means for performing the disclosed function, or a method or process for attaining the disclosed result, as appropriate, may, separately or any combination of such features, be utilised for realising the invention in diverse forms thereof.

I claim:

1. In a hollow fastener which has a transverse cross section and which includes a portion where the area of the transverse cross-section of the fastener has a minimum value, which portion is subjected to tensile stress when the fastener is in use, indicating means which comprises a stem, wherein the stem lies inside the fastener and is free to turn relative to the fastener when the fastener is unstressed and wherein a part of the stem which lies within said portion of the fastener is gripped inside the fastener by said portion of the fastener to restrain turning of the stem relative to the fastener when the fastener is subjected to a predetermined tensile stress.

2. A fastener according to claim 1 wherein the stem has a larger diameter portion and a smaller diameter portion and wherein the larger diameter portion of the stem lies inside said portion of the fastener.

3. A fastener according to claim 2 wherein the diameter of the larger diameter portion of the stem does not exceed three millimeter.

4. A fastener according to claim 1 wherein the internal diameter of the fastener vaires along the length of the fastener.

5. A fastener according to claim 1 wherein said indicating means further comprises a head at one end of the stem and wherein the head overlies a surface of the fastener.

6. A power tool for tightening a screw-threaded fastener, the tool having control means for controlling operation of the tool and signalling means for co-operating with the indicating means of a fastener according to claim 1 and with the control means to transmit to the control means a signal indicating that said selected value of stress has been attained in the fastener.

* * * * *